United States Patent Office 2,953,432
Patented Sept. 20, 1960

2,953,432

URANIUM PROCESSING

James L. Hart and Robert E. Reusser, Bartlesville, Okla., assignors to Phillips Petroleum Company, a corporation of Delaware No Drawing. Filed Nov. 13, 1958, Ser. No. 773,553

10 Claims. (Cl. 23—14.5)

This invention relates to the processing of uranium. More particularly, the invention relates to a method for recovering uranium in a more concentrated form from an aqueous uranium-bearing solution.

In the processing of uranium ores, various methods are employed for extracting the uranium values into aqueous solutions by employing either an acidic or a basic leaching solution to dissolve the uranium values from the ore. There is often required a simultaneous oxidation of the ore in order to convert the uranium values to a soluble form. In any case, the resulting uranium solutions are usually quite diluted so that large volumes of materials must be handled in order to concentrate the uranium values for further recovery.

It is an object of the invention to recover uranium in a more concentrated form from acidic or basic aqueous uranium solutions. Other objects, as well as advantages and aspects, of the invention will become apparent from a consideration of the accompanying disclosure.

In accordance with the process of the invention an acidic or basic solution containing dissolved uranium values is treated with a selected organic liquid, and the resulting mixture separated into two liquid layers, the water rich liquid layer containing dissolved uranium in a higher concentration than the original solution. The liquid phase containing the dissolved uranium usually amounts to 0.5 to about 30 percent of the total volume.

Prior art processes which have utilized certain organic liquids for the concentration of uranium solutions have employed these liquids as extractants into which uranium is dissolved. In the present process the uranium is rejected from the organic liquid rich layer and is concentrated in the water rich layer in a substantially smaller volume of water than originally. Thus, the organic liquid employed is a liquid which is quite water soluble. The uranium-rich phase can be recovered from the concentrated solution by various procedures, which will be discussed hereafter.

The aqueous uranium-bearing liquors which are beneficiated according to the process of the invention are acidic or basic systems. The acidic solutions must have a pH in the range from about 0.5 to 5, and the basic solutions must have a pH of about 8 or higher. If the pH is in the range of above about 5 and below about 8, at least a portion of the uranium is generally precipitated. In the case of the basic solutions the upper limit of pH of the solution to be treated is, as stated, 8 or above, but it is also preferably below some higher pH at which uranium precipitates from the solution; this upper pH is a variable and depends to a large extent upon the uranium concentration. Generally the upper limit of pH of 11 is applicable in all cases, but in the case of uranium concentrations of 300 mg./liter (expressed as $U_3O_8$) this upper limit can be as high as pH 13.

The amount of the selected organic liquid employed is from 0.5 to 3 volumes for each volume of water in the aqueous uranium-bearing liquid, more usually from 0.75 to 2 volumes of organic liquid for each volume of water.

The preferred organic liquid is acetone, but ethyl alcohol, n-propyl alcohol, and isopropyl alcohol are also applicable. Surprisingly, a number of other organic liquids have not been found to be effective, such as methyl ethyl ketone, ethyl acetate, cyclohexanone, diethyl Cellosolve, dimethyl sulfoxide, glycerol, methyl alcohol, and amyl alcohol. In the acid system there is also employed in the aqueous uranium solution from about 20 to 80 grams of a soluble inorganic salt per liter of water in the solution in an amount in this range effective to promote the rejection of the uranium values from the organic liquid-rich phase by a salting out effect.

Any suitable inorganic salt can be employed in the acid system to effect the salting out. A particularly useful group of salts has been found to be sodium sulphate, magnesium sulphate, zinc sulphate and aluminum sulphate. Some other salts which can be mentioned are sodium chloride, ammonium sulphate, $Na_3PO_4$, $K_3PO_4$, and $Na_4H_2PO_4$.

The uranium values can be recovered from the uranium-rich liquid phase by various procedures. In one method, addition of an alkali metal hydroxide, such as sodium hydroxide is used to precipitate uranium. The precipitated uranium can be removed by filtration. This is a conventional and well known procedure. In other well known methods the uranium can be extracted from the concentrated aqueous solution by an organic solvent such as kerosene containing an alkyl phosphate or an amine.

The following examples are illustrative of the invention, but are not to be taken as limiting thereof.

*Example I*

Uranyl nitrate, $UO_2(NO_3)_2 \cdot 6H_2O$, in amount of 3.623 parts by weight was dissolved in about 950 parts by weight of water and brought to a pH of 1.5 by addition of 4 parts by weight of a 50 percent by weight sulfuric acid solution. The solution was diluted with water. Analysis of the solution gave: dissolved uranium, expressed as $U_3O_8$=2.02 g./liter; and sulfate ion, expressed as sodium sulfate: 2.65 g./liter.

Aliquots of this acidic uranium solution were mixed with various amounts of anhydrous sodium sulfate and then with acetone in a volume ratio of acetone to water of about 1.3. Observations were made of the volume percent of the acetone rich upper layer and the greenish-colored, water rich, heavy layer which separated. From analysis of the upper acetone-water layer the percentage uranium which was separated in the lower liquid phase was obtained. These results were as follows:

| Sodium Sulfate Added, g./l.[1] | In Uranium-rich Layer— Uranium, Percent of Total | Heavy Liquid Layer, Vol. Percent |
|---|---|---|
| 10 | (2) | |
| 25 | 61.63 | 1.5 |
| 40 | 82.76 | 3.2 |
| 55 | 89.39 | 4.9 |

[1] Grams per liter of aqueous uranium solution on an acetone-free basis.
[2] No phase separation.

When only 10 gram sodium sulfate per liter was added no phase separation occurred. Increase in the sodium sulfate to 25 g./liter of the initial uranium solution resulted in the separation of a uranium-rich phase containing 61.63 percent of the uranium. The percentage uranium recovered in this manner was increased to 82.8 and 89.4 percent by increase in the amount of sulfate added to 40 and 55 grams per liter of the acid uranium solution which was used.

Example II

An alkaline uranium solution was prepared by adding 3.5775 grams of $UO_2(NO_3)_2 \cdot 6H_2O$ per liter of an aqueous carbonate solution. The carbonate solution consisted of 50 grams $Na_2CO_3$ and 15 grams $NaHCO_3$ per liter of solution. The pH of the solutions was about 9.8. Various amounts of acetone were added to portions of the alkaline uranium solution. Observations were made on the volume percent of any liquid phase which separated. From analysis of the supernatant acetone rich solutions, the amount of uranium in the greenish-colored lower uranium-rich layer was computed by difference. These results are tabulated below:

| Acetone to Water Volume Ratio | Uranium-rich Phase Separated, Vol. Percent | Uranium Separated, Percent |
|---|---|---|
| 0.26 | None | |
| 0.51 | 6.5 | 50.0 |
| 0.77 | 14.0 | 51.5 |
| 1.03 | 14.0 | 97.8 |

These data show that when the acetone to water ratio is only 0.26 there was no separation of a uranium-rich phase. For acetone to water ratios of 0.5 and higher, phase separation did occur with a concentration of the uranium in the liquid phase which separated. The uranium recovery increased from 50 to 97.8 percent by increase in the volume ratio of acetone to water from 0.5 to 1.03.

Example III

A uranium-containing liquor was prepared by extraction of an ore which had been ground to minus 20 mesh; this ore contained 0.56 weight percent uranium, expressed as $U_3O_8$. Several batches were extracted and the clarified liquors from the several runs were combined. For each extraction the slurry contained about 50 percent by weight of ore. The extraction was effected by the use of 110 to 175 pounds of sulfuric acid per ton of ore. Manganese dioxide (10 lb./ton) and air (470 cu. ft. per ton) were used as oxidants.

A 40 volume portion of the acidic uranium solution (pH about 1) was mixed with a 50 volume portion of acetone. The solution, which was cloudy with a small amount of solid matter, was clarified by filtration. To the clarified liquor there was added 5 volumes of an aqueous $Na_2SO_4$ solution containing 440 grams of $Na_2SO_4$ per liter of water, whereupon there separated about 5 volumes of a heavy, greenish-colored lower liquid phase. The uranium in this colored liquid phase was extracted into kerosene containing a dissolved amine. From two extractions, there was recovered 85.3 percent of the total uranium initially present in the liquor. Thus, the uranium was largely concentrated in the greenish-colored liquid phase which was 12.5 percent of the volume of the initial aqueous system.

The kerosene-amine solution employed in this example contained about 10 volume percent of a mixture of amines having the following structural formula:

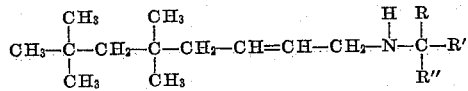

where the total carbon atoms in $R+R'+R''=11-14$ and R, R' and R'' are each alkyl groups.

Example IV

A uranium-bearing ore (0.18% $U_3O_8$) was extracted with an aqueous carbonate leach solution consisting of 50 g./liter of sodium carbonate and 15 g./liter of sodium bicarbonate, employing the leach solution in the ratio of 2444 lbs./ton of ore. The extraction was effected at 90° C. for 18 hours using as oxidants air and a solid oxidant (potassium permanganate). The uranium values were dissolved by this process in the form of the sodium uranyl tricarbonate complex. The resulting liquor from the oxidative extraction was found to contain the following: Uranium, expressed as $U_3O_8$, 1.4 g./liter; sodium carbonate, 44.6 g./liter; sodium bicarbonate, 15.8 g./liter; and sulfate, expressed as sodium sulfate, 7.95 g./liter. The pH of the solution was about 9.8.

One volume of the alkaline uranium bearing solution was mixed with an equal volume of acetone whereupon there separated 0.151 volume of a heavy uranium-rich liquid phase having a green coloration. This phase was separated from the acetone-rich upper layer by decantation, and was treated with 10.8 volumes of a sodium hydroxide solution (50 wgt. percent NaOH). The mixture was digested 7 hours at 60° C. to effect precipitation of the uranium as sodium diuranate. The yellow cake which formed was removed by filtration and washed with water. The purity of the yellow cake, expressed as percentage sodium diuranate was 88 percent. The uranium which was recovered as a yellow cake was about 96 percent of the total amount present in the original alkaline solution. Thus, the liquid phase which separated effected not only a concentration of the uranium in the heavy, water-rich liquid phase but also effected a very high recovery of the uranium. The alkaline liquor which was obtained from filtration of the yellow cake was found to contain about 1.1 percent of the uranium.

The acetone rich layer which was recovered after separation of the uranium-rich phase amounted to 1.77 volumes per volume of original alkaline uranium bearing solution. By distillation, there was recovered 1.005 volumes of an acetone solution containing 0.992 volume acetone and 0.013 volume of water. Thus, the acetone recovery was at least 99 percent. The aqueous residue left from distillation of the acetone contained 3.0 percent of the uranium.

Example V

A solution was prepared by dissolving 4.96 parts by weight of sodium uranate, $Na_2UO_4$, in about 1500 parts by weight of water and adding 7.9 parts by weight of 98 percent sulfuric acid. The solution was then diluted with water. The pH was found to be 1.5. By analysis the solution was found to contain uranium, expressed as $U_3O_8$, in the amount of 1.94 grams per liter.

Portions of the acidic solution were taken and sodium sulfate in amount of 50 grams per liter were dissolved in each, except run 4. Each solution was mixed with acetone in amounts from 1 to 3 volumes of acetone per volume of the aqueous solution. Observations were then made of the amount of the uranium rich, aqueous liquid phase which separated. The results are summarized in the tabulation below:

| Run No. | Acetone/Solution Ratio | Liquid Phase Separated, Vol. Percent of Total |
|---|---|---|
| 1 | 1.0 | 5 |
| 2 | 2.0 | 5 |
| 3 | 3.0 | 5 |
| 4 | 1.0 | [1] None |

[1] Sodium sulfate omitted.

Example VI

For these runs weighed amounts of sodium uranate were dissolved by mixing with water and sufficient 98 percent sulfuric acid to achieve solubilization of the salt. Each solution was mixed with sodium sulfate and diluted to a volume of 20 volumes so that the sodium sulfate added was sufficient to give a concentration of 50 grams per liter. The pH of these solutions was between 1.9 and 2.1. Finally, 25 volumes of acetone was mixed with each solution so that the acetone to water volume ratio was about 1.3. Observations were then made of the amount of the heavy, uranium containing, green colored liquid phase which separated from each system. The results were as follows:

| Run No. | Uranium as $U_3O_8$, g./liter on an Acetone-free Basis | pH | Uranium-rich Phase, Vol. Percent of Total Vol. |
|---|---|---|---|
| 1 | 2 | 2.1 | 5.6 |
| 2 | 4 | | 4.5 |
| 3 | 8 | | 4.5 |
| 4 | 12 | | 5.6 |
| 5 | 20 | | 6.8 |
| 6 | 50 | | 6.8 |
| 7 | 100 | 1.9 | 9.9 |

The foregoing example illustrates the concentration of uranium values according to the present process, from an aqueous solution containing varying amounts of uranium. In the process of the invention uranium solutions containing much less than 2 grams $U_3O_8$ can be treated. Also, uranium solutions containing more than 100 grams per liter can be treated. The process is most often applied, however, to solutions containing uranium, expressed as $U_3O_8$ of 100 grams per liter or less, most often 15 grams per liter or less.

*Example VII*

The following runs were made with an acidic uranium-containing solution prepared by dissolving sodium uranate in water so as to give a uranium concentration, expressed as $U_3O_8$, of about 2.0 grams per liter together with sufficient sulfuric acid to give a pH of 1.5. To 20 ml. portions of this acidic solution various inorganic salts and organic liquids were added in amounts as stated in this tabulation. Observations were then made as to the amounts of the heavy, greenish-colored liquid phase separated from each system. In the tabulation, the amount of salt added is expressed in terms of grams per liter of the acidic, aqueous uranium solution. The amount of organic liquid is expressed in terms of ratio of the volume of organic liquid to the acidic uranium solution. The results are shown in the following table:

| Salt | | Organic Liquid | | Greenish Heavy Liquid Phase, vol. percent |
|---|---|---|---|---|
| Type | Amt., g./l. | Name | Ratio | |
| $Na_2SO_4$ | 0 | Methyl alcohol | 1.0 | 0 |
| $MgSO_4$ | 40 | Acetone | 1.0 | 6.3 |
| $Al_2(SO_4)_3$ | 40 | do | 1.0 | 3.8 |
| $ZnSO_4 \cdot 7H_2O$ | 40 | do | 1.0 | 2.0 |
| NaCl | 200 | do | 1.0 | 27 |
| $Na_3PO_4 \cdot 12H_2O$ | 40 | do | 1.0 | 1.7 |
| $K_3PO_4$ | 40 | do | 1.0 | 1.7 |
| $NH_4H_2PO_4$ | 40 | do | 1.0 | 1.7 |
| $(NH_4)_2SO_4$ | 200 | do | 1.0 | 26.8 |

*Example VIII*

For these runs a simulated carbonate leach liquor was prepared by dissolving 9.9184 grams $Na_2UO_4$ in 2 liters of distilled water containing 5.65 grams of concentrated (98 percent) sulfuric acid. This solution having a pH of 2.4 was treated with a water solution containing 200 grams anhydrous sodium carbonate and 60 grams sodium bicarbonate to neutralize the acid and render the solution basic. The resulting uranium solution was diluted to 4 liters. Analysis of a portion of the solution showed the uranium content to be 1.93 grams (as $U_3O_8$) per liter. The pH of the solution was about 9.8. For each run, the solution was diluted with an equal volume of the organic liquid and observations made of the heavy, greenish-colored liquid phase which separated.

| Run No. | Organic Liquid | Heavy Liquid Phase, Vol. Percent |
|---|---|---|
| 1 | Methyl ethyl ketone | 50 |
| 2 | Ethyl acetate | 50 |
| 3 | Cyclohexanone | 50 |
| 4 | Diethyl Cellosolve | 55 |
| 5 | Dimethyl sulfoxide | 0 |
| 6 | Glycerol | 0 |
| 7 | Ethyl alcohol | 4.4 |
| 8 | Isopropyl alcohol | 13 |
| 9 | Propyl alcohol | 30 |
| 10 | Amyl alcohol | 47 |
| 11 | Methyl alcohol | 0 |

From the foregoing it will be seen that only ethyl, isopropyl and propyl alcohols were effective to concentrate the uranium in the heavy liquid phase. Thus, as to the other organic liquids employed there was either no separate liquid phase formed or there was no concentration in the heavy liquid phase. The slight concentration with amyl alcohol is insignificant and of no value. It will be noted that, surprisingly, methyl alcohol is not effective.

*Example IX*

The uranium solution used for these tests was prepared by mixing 9.9184 grams of $Na_2UO_4$ in two liters of water and adding 7.5 grams of concentrated sulphuric acid. The resulting uranium solution had a pH of 1.7. This solution was diluted with two liters of an aqueous solution containing 200 grams of sodium carbonate and 60 grams of sodium bicarbonate. The resulting solution was clarified by filtration and by analysis was found to contain in grams per liter: $2.1U_3O_8$, $48.09Na_2CO_3$, $16.38NaHCO_3$ and $2.27Na_2SO_4$. Portions of this solution were admixed with acetone as shown in the tabulation below. Observations were made of the volume percent of the heavy, uranium-rich phase which separated. By analysis of a portion of the supernatant liquid, the percentage of the uranium in the uranium-rich phase was determined. The results show that the uranium can be concentrated in the heavy phase which separates.

| Acetone to solution ratio | Heavy liquid phase, volume percent | Uranium in heavy phase, percent |
|---|---|---|
| 1.0 | 8.2 | 97.4 |
| 0.8 | 9.2 | 95.2 |
| 0.6 | 9.0 | 83.4 |

As will be evident to those skilled in the art, various modifications of this invention can be made or followed in the light of the foregoing disclosure and discussion without departing from the spirit and scope of the disclosure or from the scope of the claims.

We claim:

1. A process for recovering uranium in a more concentrated form from aqueous uranium-bearing solutions which comprises mixing said solution with a selected organic liquid and allowing the resulting mixture to separate into two liquid phases, the heavier of which contains dissolved uranium values in a higher concentration than the original aqueous solution, the original aqueous uranium-bearing solution being selected from the group consisting of a basic solution having a pH in the range from 8 to 11 and an acidic solution having a pH in the range from 0.5 to 5, the volume ratio of said selected organic liquid to water in said resulting mixture being in the range from 0.5 to 3, the organic liquid being selected from the group consisting of acetone, ethyl alcohol, n-propyl alcohol and isopropyl alcohol; wherein said original acidic aqueous solution contains an amount of an inorganic salt in the range from about 20 to 80 grams per liter of water, said salt being selected from the group consisting of sodium sulfate, zinc sulfate, magnesium sulfate and aluminum sulfate.

2. A process of claim 1 wherein the volume ratio of said selected organic liquid to water in said resulting mixture is in the range from 0.75 to 2.

3. A process of claim 1 wherein the initial aqueous uranium-bearing solution is an acidic uranium-bearing solution having a pH in the range from 0.5 to 5.

4. A process of claim 3 wherein said salt is sodium sulfate.

5. A process of claim 1 wherein the initial aqueous uranium-bearing solution is an aqueous solution having a pH in the range from 8 to 11.

6. A process of claim 1 wherein said organic liquid is acetone.

7. A process of claim 5 wherein said organic liquid is acetone.

8. A process of claim 5 wherein said organic liquid is isopropyl alcohol.

9. A process of claim 5 wherein said organic liquid is ethyl alcohol.

10. A process of claim 5 wherein said organic liquid is n-propyl alcohol.

References Cited in the file of this patent

UNITED STATES PATENTS

| | | |
|---|---|---|
| 2,800,387 | Kimball et al. | July 23, 1957 |
| 2,839,357 | Clark et al. | June 17, 1958 |

OTHER REFERENCES

Katzin et al.: AECD-2537, March 18, 1949, pages 1, 7-9, 14-18.